United States Patent [19]
Allen, Jr. et al.

[11] Patent Number: 5,590,042
[45] Date of Patent: Dec. 31, 1996

[54] INDEPENDENT BRAKE CONTROL

[75] Inventors: John J. Allen, Jr., Watertown; Kevin B. Root, Black River, both of N.Y.

[73] Assignee: New York Air Brake Corporation, Watertown, N.Y.

[21] Appl. No.: 392,211

[22] Filed: Feb. 22, 1995

Related U.S. Application Data

[63] Continuation-in-part of Ser. No. 204,450, Feb. 7, 1994, Pat. No. 5,412,572, which is a continuation of Ser. No. 984,100, Dec. 1, 1992, abandoned, which is a continuation of Ser. No. 447,816, Dec. 8, 1989, Pat. No. 5,172,316.

[51] Int. Cl.$^6$ ............................................. B60T 13/68
[52] U.S. Cl. .................. 364/426.01; 246/182 B; 303/3; 303/15; 303/20
[58] Field of Search ............. 364/426.01, 426.02; 303/3, 15, 20, 33, 70, 80, 81, 82, 22 R, DIG. 3; 246/182 B, 182 R

[56] References Cited

U.S. PATENT DOCUMENTS

| | | | |
|---|---|---|---|
| 3,380,399 | 4/1968 | Southard et al. | 246/182 R |
| 3,519,805 | 7/1970 | Throne-Booth | 246/182 B |
| 3,910,639 | 10/1975 | Engle | 303/15 |
| 4,005,838 | 2/1977 | Grundy | 246/187 B |
| 4,042,810 | 8/1977 | Mosier | 105/61 |
| 4,052,109 | 10/1977 | Nacase et al. | 303/3 |
| 4,107,253 | 8/1978 | Borg et al. | 246/182 B |
| 4,181,369 | 1/1980 | Balukin et al. | 303/16 |
| 4,316,640 | 2/1982 | Cripe | 303/15 |
| 4,344,138 | 8/1982 | Frasier | 303/20 |
| 4,347,569 | 8/1982 | Allen Jr. et al. | 364/426.02 |
| 4,402,047 | 8/1983 | Newton et al. | 303/3 |
| 4,534,599 | 8/1985 | Wright et al. | 303/22 R |
| 4,553,723 | 11/1985 | Nicholes et al. | 246/182 R |
| 4,555,766 | 11/1985 | Wright | 303/95 |
| 4,582,280 | 4/1986 | Nicholes et al. | 246/182 R |
| 4,598,953 | 7/1986 | Wood et al. | 303/15 |
| 4,652,057 | 3/1987 | Engle et al. | 303/3 |
| 4,830,437 | 5/1989 | Rumsey | 303/15 |
| 4,854,648 | 8/1989 | Nakao | 303/81 |
| 4,859,000 | 8/1989 | Deno et al. | 303/33 |
| 4,904,027 | 2/1990 | Skantar et al. | 303/15 |
| 5,104,203 | 4/1992 | Ferri | 303/15 |
| 5,192,118 | 3/1993 | Balukin et al. | 303/15 |
| 5,222,788 | 6/1993 | Dimsa et al. | 303/15 |

*Primary Examiner*—Gary Chin
*Attorney, Agent, or Firm*—Barnes & Thornburg

[57] ABSTRACT

A computerized locomotive control system receives as inputs electrical signals representing automatic and independent braking control signals from controllers and pipe pressures and has a computer for determining, from said input signals, electrical signals representing desired braking and pipe pressures. The computer in the lead locomotive uses the independent application and brake pipe pressure to control the brake cylinder pressure except where the independent application and release brake pipe has been tested as a fault or during the initial buildup of the independent application brake pipe. In this instance, independent application and release controller position is used to control the brake cylinder pressure.

11 Claims, 11 Drawing Sheets

INDEPENDENT BRAKE CONTROL

CROSS REFERENCE

This is a continuation-in-part of application Ser. No. 08/204,450, filed Feb. 7, 1994 now U.S. Pat. No. 5,412,572 which is a continuation of application Ser. No. 07/984,100, filed Dec. 1, 1992 now abandoned which is a continuation of application Ser. No. 07/447,816, filed Dec. 8, 1989, now U.S. Pat. No. 5,172,316 issued Dec. 15, 1992.

BACKGROUND AND SUMMARY OF THE INVENTION

This invention relates generally to novel and improved brake equipment for rail vehicles and more particularly to independent brake control in computer controlled brake equipment located on the locomotive and arranged to control the application and release of the brakes of such locomotive, any trailing locomotive, and any cars coupled to either.

Prior art brake equipment for locomotives has typically been implemented with mechanical and pneumatic hardware, as, for example, the 26-L brake equipment of New York Air Brake Company of Watertown, N.Y. As illustrated in FIG. 1, this prior art brake equipment employs as major components a 26-C brake valve 30 including an independent brake valve SA-26, a 26-F control valve 33 and a J relay valve 37 interconnected with various pneumatic pipes represented by solid lines. The brake valve 30 responds to movement by the train operator of an automatic brake handle 31 to regulate pressure in a brake pipe 40 by means of an equalization reservoir 36 and a brake pipe relay in the brake valve 30 for application and release of brakes on the locomotive, the brakes of any trailing locomotive and the brakes of cars coupled to either.

The automatic brake handle has six positions as illustrated by the sector diagram in FIG. 2. The brake valve 30 also responds to movement of an independent brake handle 32 by the train operator to control the application and release of the locomotive brakes independently of the train brakes and for bailing-off or releasing an automatic brake application of the locomotive independently of the train brakes by way of the 26-F control valve 33 and the J relay 37.

The independent brake handle 32 has two extreme positions, Release and Full Application separated by an application zone as shown in FIG. 2. As the handle is moved from the Release position through the application zone toward the Full Application position will apply the locomotive brakes. The independent handle 32 can be depressed so as to cause a bailing-off or the release of any automatic brake application existing on the locomotive (due to operation of the automatic brake handle 31). This is effected via the 26-C brake valve 30 and the 26-F control valve 33. If the independent brake handle 32 is in an Application position, the locomotive brake will be applied according to the higher of independent or automatic brake.

The 26-F control valve 32 and auxiliary reservoir 36 respond to service and emergency rates of brake pipe pressure reduction (brake applications) to control the locomotive brake cylinder pressure via the J relay valve 37. The 26-F control valve 33 also responds to a brake release operation of the independent brake handle 32 to control locomotive brake cylinder pressure to release the locomotive brakes following an automatic brake operation at the service and emergency rate developed by operation of the automatic brake handle 31. A key element of the 26-F control valve 30 is a double check valve 34 which applies to the J relay valve 37 the higher of the pressures developed by the 26-F control valve 33 or by the independent application and release pipe 42.

The J relay valve 37 is a volume amplifier that operates to translate the pressure at a smaller volume input to a desired pressure at a larger volume output. As the desired output pressure can differ for different locomotive (different sized brake cylinders), it has been necessary to select a particular J relay valve for a particular locomotive specification.

The P2-A valve 35 is a brake application or penalty valve responsive to unsafe conditions to effect brake application at the full service rate. For instance, the P2-A valve is illustrated as responding to an overspeed condition and/or to a foot pedal fault (absence of foot pressure on the foot pedal).

The brake equipment also includes a multiple unit valve 38 enabling the locomotive to be united with other locomotives as either a lead, trail or dead unit. The multiple unit valve 38 of a lead unit serves to signal trail units via independent brake application and release pipe 42 and an actuating pipe 43. In the lead position, multiple unit valve 38 connects the actuating pipe signal from brake valve 30 to the control valve 33 and actuating pipe 43 and connects the independent application and release signal from the brake valve 30 to the independent application and release pipe 42.

The prior art brake equipment is costly to manufacture as it requires substantial iron and aluminum castings for each of the pneumatic valves and is costly to install as it requires numerous pipe interconnections.

Computerized brakes are well known as shown by U.S. Pat. No. 4,402,047 to Newton et al. In this computerized brake control system, the computer calculates the desired brake cylinder pressure from commanded brake signals, vehicle weight, vehicle speed and dynamic braking and compares the desired brake cylinder pressure with the actual brake cylinder pressure. Then it controls the fluid brake system to cause the actual brake pressure to be substantially equal to the desired brake pressure. As illustrated in FIG. 2 of that patent, the brake control manifold 40 has an electromagnetically controlled apply valve 46 and release valve 48 under the control of computer to cause the desired brake cylinder pressure to match the desired brake cylinder pressure.

Another system which shows the use of magnetic valves for applying and releasing brake pressure is U.S. Pat. No. 4,652,057 to Engle, et al. Single control handle 76 is used in combination with a control panel 102 and a display 96. In both systems, the electromagnetically controlled valves control the specific pressure applied to the brake cylinders from a reservoir and does not control the pressure within the reservoir.

Prior systems have also included a substantial amount of fluid tubing which is costly to build and maintain. Similarly the interlocks between the propulsion and braking system have been mechanical and also a function of the operator.

Prior computerized brake systems, have not improved the response of the independent brakes. The control of the independent brakes is a function of the pressure buildup on the independent application and release pipe. Also, where the independent application and release pipe has failed, the computerized brake system did not allow control of the locomotive brakes.

Thus this is an object to present invention to provide a novel computer interface for a computer controlled rail brake equipment with an enhanced independent brake control.

Another object of the present invention is to provide a braking system which will accelerate initial response of the independent brake operation.

Still a further object of the present invention is to provide a computer controlled railway brake system which allows control of the independent brake for failure of the independent application and release pipe.

These and other objects of the present invention are achieved by providing a computerized locomotive control system which receives as inputs electrical signals representing braking control signals from at least an independent application and release controller and an independent application and release pipe and electrical signals representing leading and trailing modes. A computer determines desired pipe pressure signals in response to the braking control signals and determines brake cylinder control signals only in the leading mode in response to the braking control signals from the independent application and release controller and the independent application and release pipe. Pressure in said pipes and said brake cylinder are controlled in response to the desired pipe pressure signals and brake cylinder control signal. The computer determines the brake cylinder control signal also from said brake pipe and actuator pipe pressure signals. The brake cylinder includes a control reservoir and the computer determines a desired control reservoir pressure signal as the brake cylinder control signal in response to the braking control signals.

The computer means determines the brake cylinder control signal initially in response to braking control signals from the independent application and release controller and subsequently in response to braking control signals from the independent application and release pipe. Preferably, the computer determines the brake cylinder control signal in response to braking control signals from the independent application and release controller for independent application and release pipe pressure up to generally 20 psi and in response to braking control signals from the independent application and release pipe for independent application and release pipe pressure above generally 20 psi.

The computer also determines failure of said independent application and release pipe and determines the brake cylinder control signal in response to braking control signals from the independent application and release controller during failure of the independent application and release pipe. The computer determines failure of the independent application and release pipe when the desired independent application and release pipe pressure is above a first value and the independent application and release pipe pressure is below a second value less than the first value after a predetermined period of time.

Other objects, advantages and novel features of the present invention will become apparent from the following detailed description of the invention when considered in conjunction with the accompanying drawings.

DETAILED DESCRIPTION OF THE DRAWINGS

Figure 1:
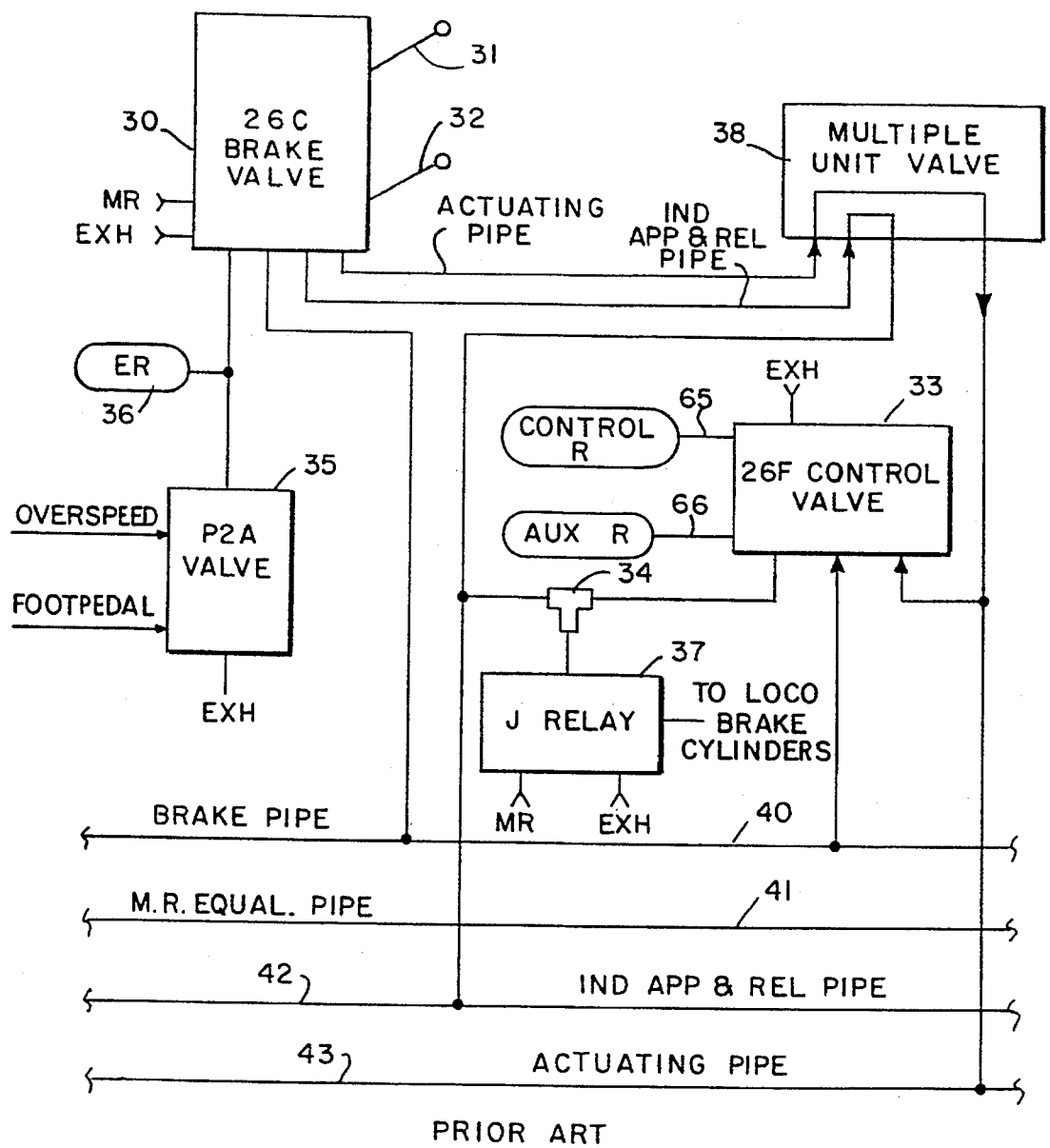
FIG. 1 is a block diagram of a pneumatic brake system of the prior art.
Figure 2:
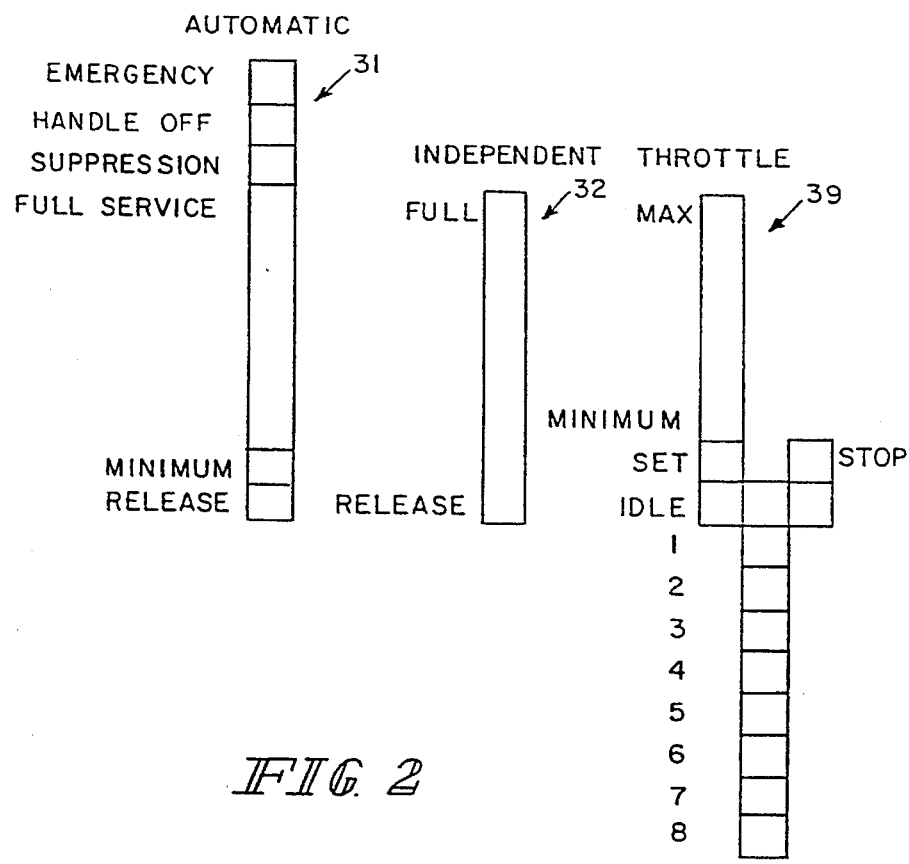
FIG. 2 is a schematic representation of the control handles of the master control stand including the automatic braking, independent braking and the throttle handles.
Figure 3:
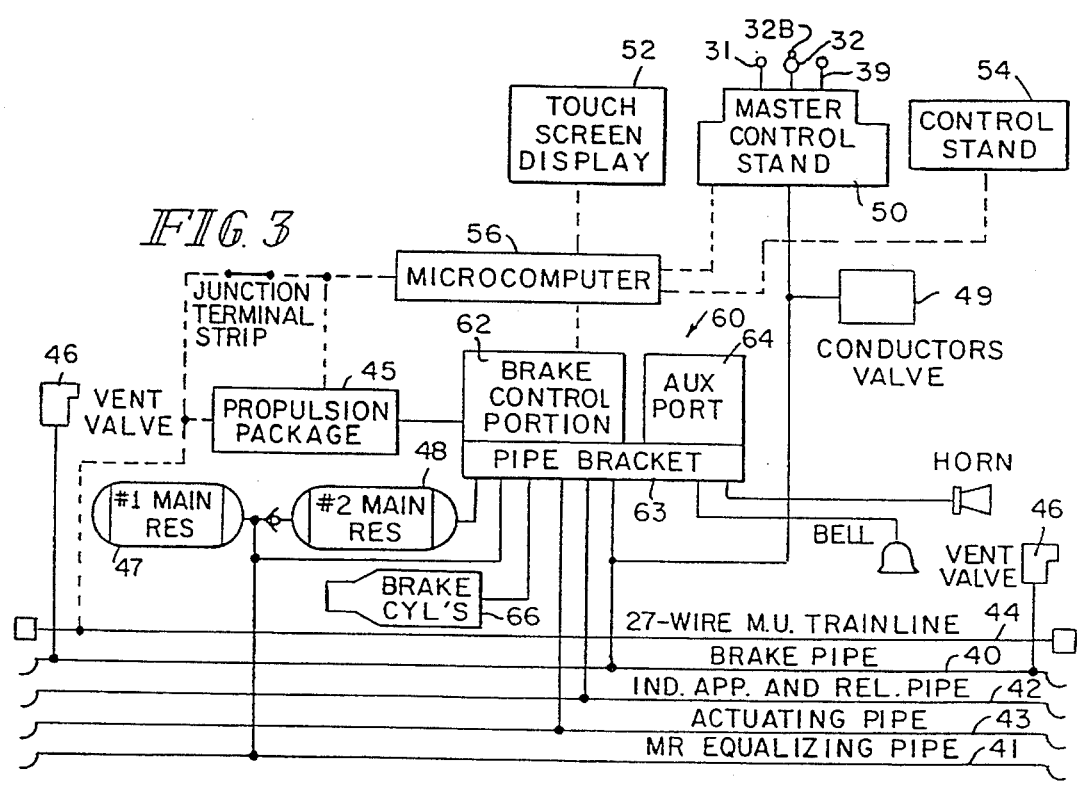
FIG. 3 is a schematic representation of a locomotive control system incorporating the principles of the present invention.

A computerized locomotive control system of the present invention is illustrated in FIG. 3. It should be noted that in the Figures the fluid lines of the pneumatic system will be illustrated by solid lines whereas the electrical interconnections will be illustrated by dash lines. Wherever possible the elements, for example the trainlines and the control handles, in the Figures will have the same numbers as those of the prior art described in FIGS. 1 and 2. A master control stand 50 includes the automatic brake handle 31, the independent brake handle 32 and the throttle 39. The locomotive includes the brake pipe 40, the main reservoir equalization pipe 41, the independent application and release pipe 42, actuating pipe 43, and a 27-wire multiple unit electrical trainline 44. The standard pair of venting valves 46 are provided on the brake pipe 40.

The master control stand 50 is fluidly connected to the brake pipe 40 so as to directly apply an emergency condition fluidly to the brake pipe. A conductor valve 49 is also connected to the brake pipe 40 to apply an emergency condition. The master control stand 50 is electrically connected to the microcomputer 56 as are touch screen display 52 and an auxiliary control stand 54. Microcomputer 56 is connected to the propulsion package 45, which is a standard prior art propulsion package, and both are connected to the 27-wire trainline 44 for electrically communicating with the other locomotives on the train.

An electro-pneumatic interface control valve 60 between the microcomputer 56 and the pneumatic braking system is shown as including the brake control portion 62 and an auxiliary portion 64 both connected to pipe bracket 63. Interface control valve 60 provides all the functions of the control of the brakes, both pneumatically and electrical signalling, and for auxiliary controls. The pipe bracket 63 is a connection of all pipe interfaces which provides a unitized valve for simplification of maintenance. The pipe bracket has the required reservoir for brake operations and contains disposable filters for the pneumatic inputs. The brake control portions 62 provides for all braking portions found on the locomotive. This controls the brake pipe 40, the brake cylinder of the locomotive 66, independent application and release pipe 42 and actuating pipe 43. It provides all the required electrical interfaces for the operation of the brake system. The auxiliary portion 64 provides pneumatic controls for the special functions. This may be for the sanding, pneumatic horns, bells etc . . . Auxiliary portion 64 operates independent of the brake valve. A first main reservoir 47 is connected to the main reservoir equalization pipe 41 as is a second main reservoir 48. The second main reservoir 48 is connected to the electro-pneumatic interface control valve 60.

The system of FIG. 3 is a simplification of the controls by consolidating the numerous engineer control devices in a central location. Controls have been consolidated into a three handle master controller unit 50 and a touch screen display 52. All of the normal train operation will be obtainable through these two devices. A fuel pump, engine run, headlights, auxiliary lights and heater controls are not incorporated into the microcomputer 56 since they would not simplify the operation. These functions are in the auxiliary control stand 54.

The pneumatic brake control devices that had to be of a mechanical nature is simply accomplished by a computer logic. The resulting reduction of pneumatic control devices, allows the consolidation of brake control into a unitized package. Required periodic brake overall can now be accomplished through the removal and rebuilding of a single valve package. The maintenance will also be simplified by diagnostic capabilities under computer control. Faults can be pinpointed and displayed to the maintenance personnel.

Other than the single pneumatic control between the master control stand 50 and the brake pipe 40 to provide an emergency brake application directly to the brake pipe 40, the master control stand 50 is connected to the pneumatic part of the brake system through the microcomputer 56. All handles are independent of each other and their is no mechanical interlock between the handles. The interlock is electrically provided by the microcomputer 56 thereby simplifying the master control stand 50. In the trail mode or cutout positions, the handles 31, 32 and 39 are free to be moved and will produce no action through a computer lockout. The only action is the emergency brake application produced pneumatically. The computer 56 is still responsive to the 27-wire trainline 44 and the pipes to provide appropriate controls even in the trail mode.

The automatic brake handle 31 provides an analog signal to the microcomputer 56 to the level of command brake or special commands as shown in FIG. 2. The Release position provides maximum level of the analog signal to the microcomputer 56 to charge the brake pipe fully or automatically release the brakes. The Minimum brake application position provides a linear decrease in its analog output signal proportional to the extremes between release and emergency positions. This signals the microcomputer 56 to reduce the brake pipe pressures sufficient to initiate quick service and set the brakes on the cars. This is generally a 4 to 6 psi brake pipe reduction. The Full Service brake application position provides a further decrease in its analog signal. Movement of the handle 31 from the Minimum position signals the computer to further reduce the brake pipe 40 proportional to the handle position up to the Full Service or maximum service brake position.

The microcomputer 56 controls the brake pipe 40 in such a manner that the Full Service position is the maximum service brake available for the initial brake pipe setting. The computer has the capability of proportioning the brake pipe signals as a function of release minimum service to a full service application based on the initial brake pipe setting. This overcomes a substantial number of the problems of the prior as discussed above.

A Suppression position is provided on a standard automatic handle 31 and may be ignored by the computer logic. It is only provided for the engineers convenience. The purpose of the Suppression position is to indicate that the handle is in Full Service to the overspeed and/or safety control logic, therefore the Full Service position is sufficient for this purpose. The Handle Off position is also not required but may be used to signal to the microcomputer 56 to reduce the brake pipe pressure to zero. The Emergency position has the least analog output and signals the microcomputer 56 that an emergency reduction of the brake pipe is required. This position mechanically sends the brake pipe directly to atmosphere and results in an emergency application regardless of state of the computer or cut-off device to be described later.

Although the movement of automatic brake handle from Full Service towards Release may increase analog signal, microcomputer 56 will not react. Brake pipe charge or brake release command may only be achieved in the Release position. If preferred, the logic can be changed to allow gradual brake release for passenger service operation. Failure of the automatic brake handle 31 or loss of the analog signal will result in a null output from the master control stand 50. The microcomputer 56 will interpret this as a reduction of the brake pipe to zero at a service rate. This is the same command as the Handle Off position.

The independent brake handle 32, which provides independent control over the locomotive brake versus the train brake of the automatic brake handle 31, also provides an analog output signal to the microcomputer 56 proportional to handling extreme positions. Unlike the automatic brake handle 31, loss of an analog signal from the independent brake handle 32 results in releasing the locomotive brake and does not result in a brake application as in the automatic brake handle failure. Thus the engineer has the option of completing the run or moving to a sidetrack from the leading cab. Independent brake handle 32 moves between the Release position as a minimum analog output signal to the Full position which has the maximum analog output signal. This movement will result in a fully variable analog output signal in either direction and a fully variable increase and decrease of pressure in the independent application and release pipe 42 under the command of the computer 56.

A modification of the independent brake handle 32 is illustrated in FIG. 3 as having a button 32b which actuates a momentary switch. The pressing of button 32b is a command to pressurize the actuating pipe 43. Release of the button will vent the actuating pipe 43. This provides the "bail-off" feature of the automatic brake and if the button is continuously depressed, "bailoff" of an emergency brake. This is to be distinguished from the prior art wherein the independent brake handle 32 itself had to be physically depressed to effectuate this function mechanically and pneumatically.

FIG. 2 also illustrates the third master control stand handle 39 which is the throttle. As shown in FIG. 2, the throttle 39 includes the standard 1 to 8 propulsion positions as well as the dynamic braking which goes from a set position to a maximum. Between the propulsion and dynamic braking portion is the Idle position and a Stop Engine off position. The throttle lever 39 provides an analog output signal proportional to handle position with the maximum output representing maximum power. The microcomputer 56 reads the propulsion detents 1–8 and provides appropriate signals on the 27-wire trainline 44. It also monitors the Idle, Set and Dynamic braking positions. In the Stop position, a shutdown of the engines is provided as a digital signal that circumvents the microcomputer 56. Whereas the automatic brake handle 31 and Independent brake handle 32 are of standard configurations, the throttle 39 is a new and distinctive control handle.

The touch screen display 52, has three basic functions. It provides an indication of all of the status of the train controls, it provides switching functions by the touching of the screen, and it provides special messages to the engineer. With locomotive in the cut-out or trail mode, the screen is blank. Activation or cut-in of the locomotive brings up the control screen display.

Figure 4:
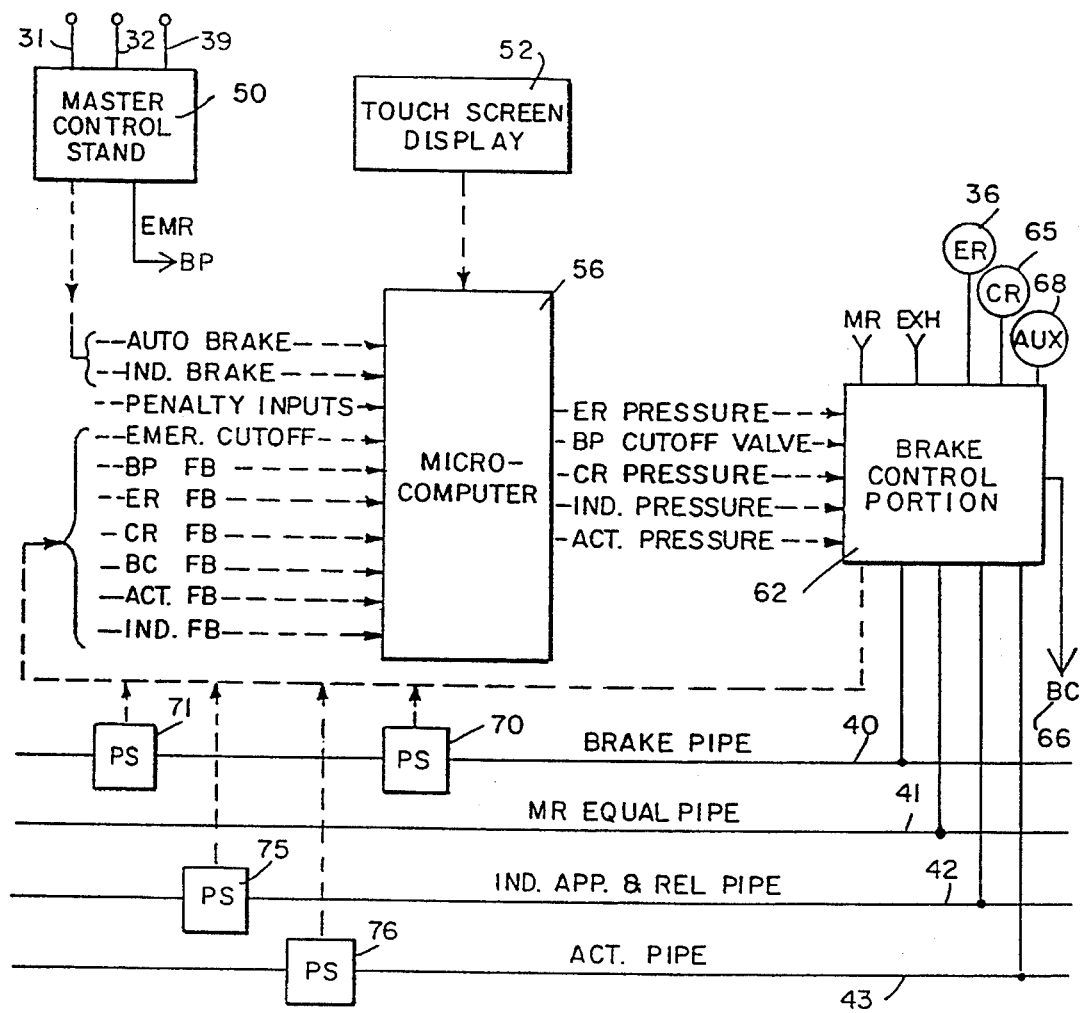
FIG. 4 is a block diagram of a computer controlled railroad locomotive brake equipment incorporating the principles of the present invention.

An overview of the brake control portion 62 of the interface control valve 60 will be described with respect to FIG. 4. The brake control portion 62 is connected to main reservoir MR, the main reservoir equalization pipe 41, and exhaust EXH as well as the equalization reservoir 36, the control reservoir 65, and the auxiliary reservoir 68 pneumatically. It also provides a pneumatic output to the brake cylinder BC, 66, the brake pipe 40, the independent application and release pipe 42 and the actuating pipe 43.

Brake control portion 62 receives electrical control signals for the equalization reservoir pressure, brake pipe cutoff valve, the control reservoir pressure, the independent application and release pipe pressure and the actuating pipe pressure from the microcomputer 56. Inputs to the microcomputer 56 includes the automatic brake and independent brake electrical signals from the master control stand 50, penalty inputs from standard penalty devices as electrical signals as well as a group of electrical feedback signals. These feedback signals from pressure sensors include brake pipe pressure 70, emergency cutoff pressure 71, equalization reservoir pressure 72, control reservoir pressure 74, brake cylinder pressure 73, actuating pipe pressure 76 and independent application and release pipe pressure 75.

Figure 5:
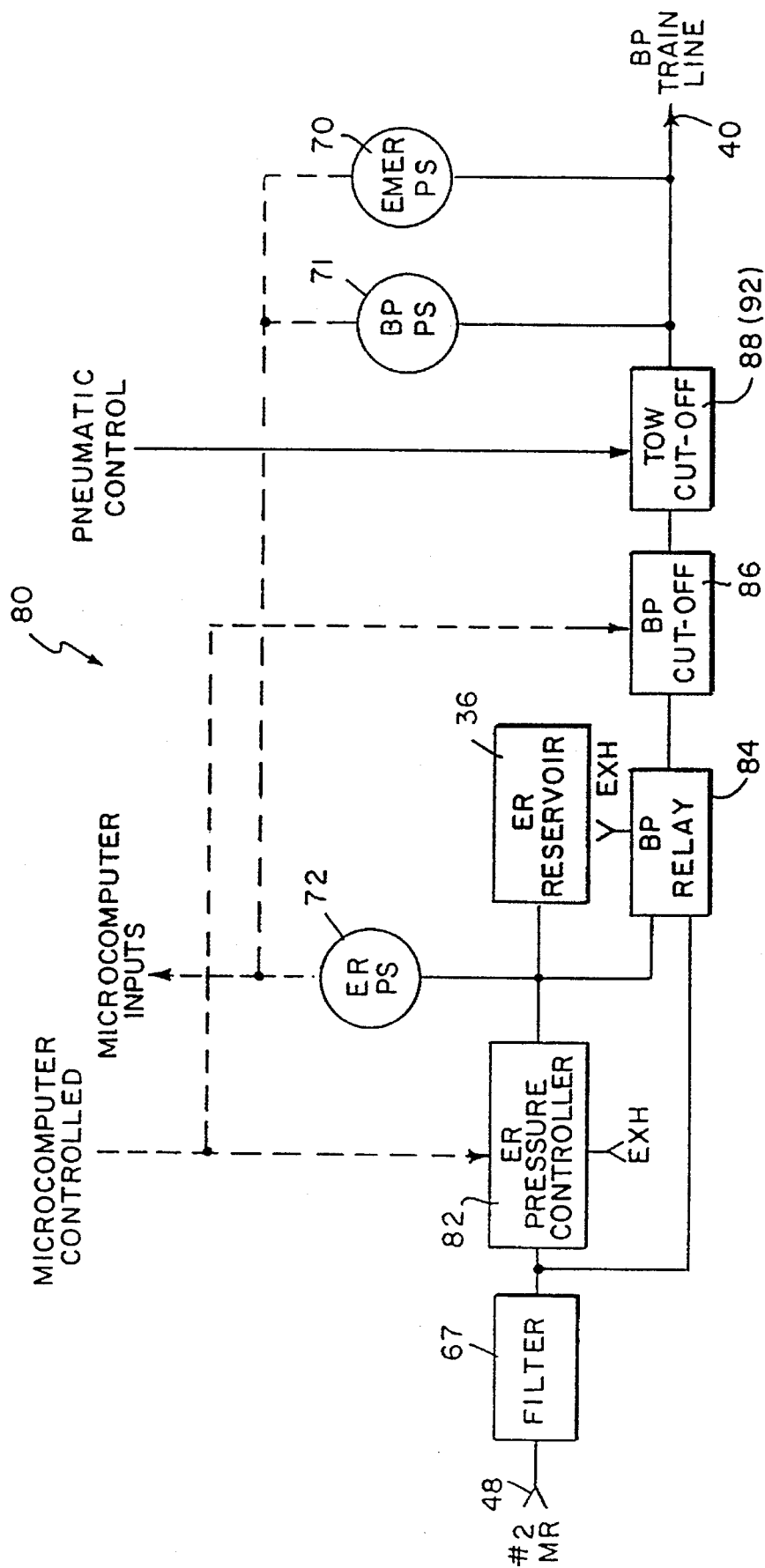
FIG. 5 is a block diagram of the brake pipe control incorporating the principles of the present invention.

The circuitry for the brake pipe control 80 of the brake control portion 62 of the interface control valve 60 is illustrated in FIG. 5. Brake pipe control 80 is connected to the second main reservoir 48 through a filter 67. Equalization reservoir 36 has its pressure controlled by the equalization reservoir pressure controller 82 under the command of the microcomputer 56. The pressure of the equalization reservoir 36 is measured by a pressure sensor 72 and fed back to the microcomputer 56. The value of the pressure in the equalization reservoir 36 is provided to the brake pipe relay 84 which will transmit a portion of the main reservoir's 48 pressure to the trainline brake pipe 40 through brake pipe cutoff 86 and tow cutoff 88. The brake pipe cutoff 86 is an electro-pneumatic device under the control of the microcomputer 56 and the tow cutoff 88 is pneumatically controlled. Brake pipe pressure sensor 71 and emergency pressure cutoff sensor 70 are also shown in FIG. 6.

The brake pipe control 80 is active only if the locomotive is in the lead or keyed in mode. The control of the brake pipe control 80 is similar to the number 26 brake equipment in that a reference volume or equalization reservoir 36 is used. The design is fail safe in that failure of that device results in a service brake application. In the event of total failure of the microcomputer 56, a service brake reduction rate will occur.

The tow cutoff device 88 is a pneumatically operated device. It will prevent any supply or exhaust of the brake pipe 40 for haul of the locomotive with an inoperative microcomputer 56. This devices function is integral in operation with the tow cutoff 92 of the triple valve to be discussed in the brake cylinder control 90 of FIG. 6.

Figure 6:
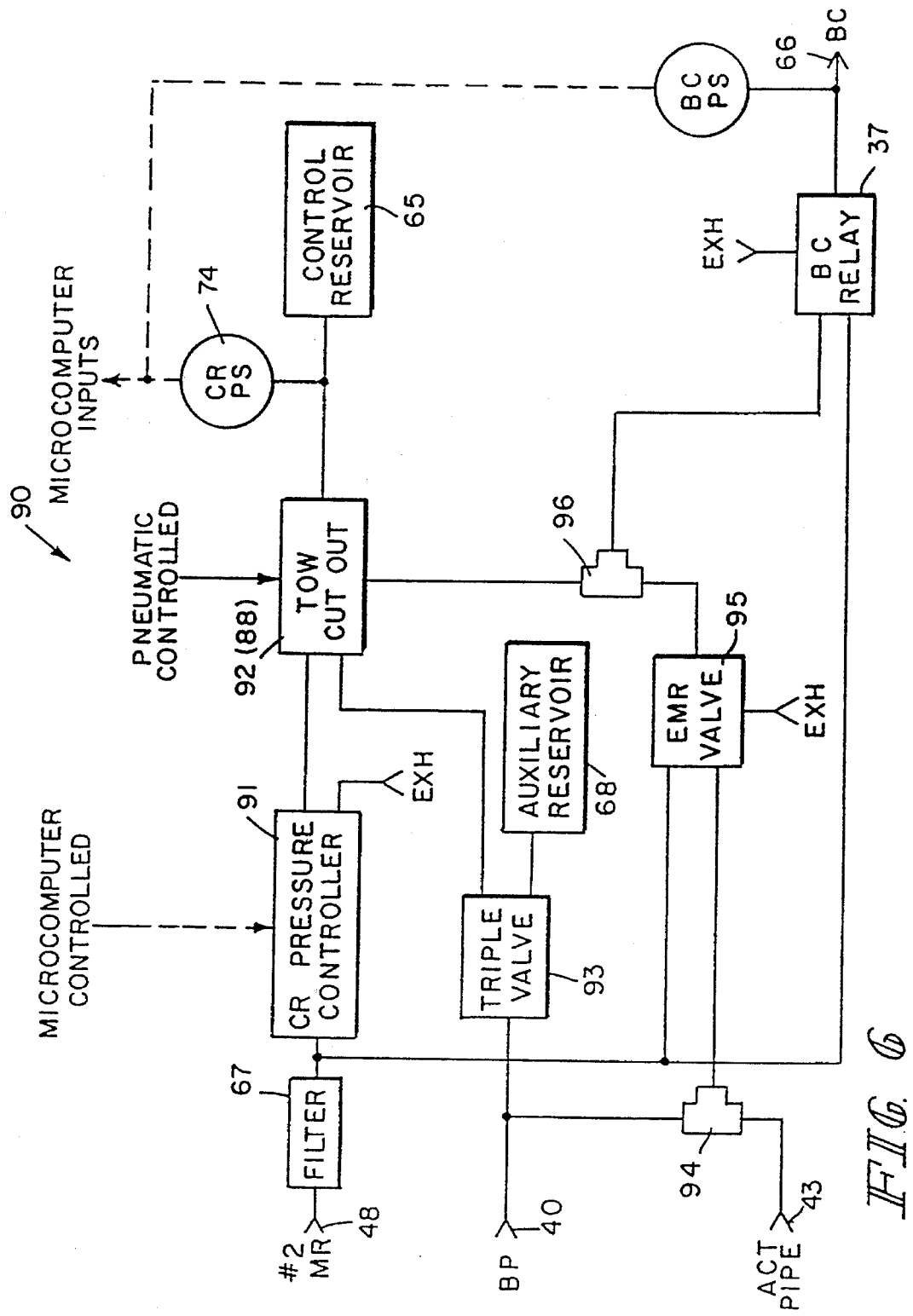
FIG. 6 is a block diagram illustrating the brake cylinder control incorporating the principles of the present invention.

The circuit for the brake cylinder control 90 of the brake control portion 62 of the interface control valve 60 is illustrated in FIG. 6 as having an input from the second main reservoir 48 through common filter 67 to the control reservoir controller 91. The control reservoir pressure controller 91, under control of computer 56, determines the pressure in control reservoir 65 which is sensed by the control reservoir pressure sensor 74 and provided as an input to the microcomputer 56. The control reservoir pressure controller 91 is connected to the control reservoir 65 through the tow cutout or switch over device 92 which is electro-pneumatically controlled. A triple valve 93 connects the brake pipe 40 and the auxiliary reservoir 68 to the tow cutoff device 82. The output of the tow cutoff device 82 is connected to the brake cylinder relay 37 through a double check valve 96. The second input to the double check valve 96 is an emergency valve 95 which receives on its controlling input the brake pipe pressure on brake pipe 40 or the pressure from the actuating pipe 43. The higher the two signals is provided by the double check valve 94 to the emergency valve 95.

The higher value of the output of the emergency valve 95 and the tow cutout 92 is provided by the double check valve 96 to the brake cylinder relay 37 on its control input. The main reservoir 48 is the supply input to the emergency valve 95 and the brake cylinder relay 37. The output of the brake cylinder relay 37 is connected to the brake cylinder 66. The pressure of the brake cylinder 66 is measured by the brake cylinder pressure sensor 73 and provided as an input back to the microcomputer 56.

Service brake cylinder pressure is controlled solely by the microcomputer 56 under normal operating conditions. Emergency brake pressure is pneumatically controlled, circumventing any command of the microcomputer 56. The tow cutout 92 in combination with the triple valve 93 provides for pneumatic control service brake for tow of a faulty locomotive.

The control reservoir pressure controller 91 is an electro-pneumatic device to control the reference pressure in the control reservoir 65. The microcomputer 56 control the output pressure electrically for command of automatic service brake level. The control is fully variable from zero psi to main reservoir pressure.

In the preferred embodiment, the microcomputer derives the control, for the control reservoir pressure controller 91 from sensed pipe pressure signals from the brake pipe 40, independent application and release pipe 42 and actuator pipe 43. The train braking signal on these three pipes are produced by the brake control portion 62 on this or another locomotive and the microcomputer 56 on all locomotives respond to the same pipe pressure signals at the same time. As an alternative, the microcomputer 56 could derive the controls for the control reservoir pressure controller 91 from the master stand 50 if the locomotive is in the lead mode. Generally, this is not preferred since appropriate time delays would have to be present to prevent the lead locomotive from applying its brakes before the remainder of the train.

To enhance the response of the independent brake, the present system uses the independent handle position initially for the control of the brake cylinder pressure and then subsequently uses the signals from the independent application and release pipe 42. This avoids the time lag produced by the buildup of pressure in the independent application and release pipe 42. Thus, the lead locomotive has its brakes applied using the position of the handle 32 while the independent application and release pipe 42 and the brake cylinder 66 are being charged. This results in improved feel for the engineer, as almost immediately, the brake pressure is felt due to handle movement.

During the release of the independent brake, the system immediately begins to reduce brake cylinder pressure if the independent application and release handle position calls for less than the initial value set for the independent application and release pipe 42. Again, this gives an improved response during a release also. Preferably, 20 PSI is value selected below which the independent brake and application handle 32 controls the brake cylinder pressure on the lead locomotive for the independent application and release. This feature is for better response during Hostling operation in the yard when quick response and good feel is desired by the operators. It overcomes the problems of sluggish brake cylinder buildup.

Another situation where the locomotive brake cylinders can be controlled by the position of the independent application and release handle 32 is for failure of the independent application and release pipe 42. Again, this applies only to the locomotive which is in the lead mode. This provides fast safe operation of the locomotive when operated as a single unit because the system automatically detects failure of the independent application and release pipe 42 to develop the appropriate pressure and then applies the desired brake cylinder pressure. The microprocessor 56 determines the desired brake, independent application and release pipe pressure and monitors it by independent pressure sensor 75 illustrated in FIG. 7. If the sensor value is not at the desired value, the computer then uses the position of the independent application and release brake handle 32 to control the brake cylinder pressure and not the independent application and release pipe pressure value. If the independent application and release pipe 42 fail, those locomotive in the trail mode will not respond. It is only the lead locomotive which has the capability of responding to the position of the independent application and release handle 32. The test usually performed to determine whether the independent application and release pipe pressure is a given value after a predetermined time. If not, a failure is detected and the independent application and release handle 32 is used to control the brake cylinder pressure on the lead locomotive.

This feature allows not only the lead locomotive to have independent brake control with failure of the independent application and release pipe, but also the failure of the portion of the computer system which controls the independent application and release pipe 42. On a single locomotive, this can cause a dangerous situation if the engineer does not realize that there is a failure. The present system by recognizing the failure automatically applies the correct amount of brake. The engineers are notified of the problem by the normal means, for example, alarm bells, flashing light or message indicators on the display console 52.

In the event of an emergency brake signal on the brake pipe 40, the emergency valve 95 actuates pneumatically a loss of brake pipe pressure. The emergency valve 95 supplies a preset pressure output from the main reservoir 48 directly to the control port of the brake cylinder relay 37 negating any command pressure on the other input of the double acting check valve 96 from the microcomputer controlled reservoir 65. This emergency pressure output command may be removed to release the locomotive brake 66 by pressurizing the actuating pipe 43. This signal on actuating pipe 43 through double check valve 94 changes control input of emergency valve 95. The double check valve 96 also limits the output pressure from the control reservoir 65 to the emergency pressure level and prevents a malfunction of the control reservoir pressure controller 91.

On the failure of the microcomputer 56 for any cause, the triple valve 93 is included to tow the locomotive. The triple valve 93 will provide automatic service brake control pressure and is a displacement valve brake control device. To switch over from the reservoir pressure controller 91 to the triple valve 93 as a controller for the control reservoir 65 is under the control of the tow cutout 92.

The triple valve 93 charges the auxiliary reservoir 68 at a controlled rate within the value of the brake pipe 40 pressure. When the brake pipe pressure is reduced, the triple valve 93 will move to the applied position providing auxiliary reservoir 66 pressure to the control reservoir 65. This flow will cease when the auxiliary reservoir 66 pressure has reduced to brake pipe 40 pressure. The triple valve 93 will move into the lap position. Further reduction of brake pipe will again cause the auxiliary reservoir 66 pressure to flow to the control reservoir 65 thereby increasing the brake cylinder pressure until the auxiliary reservoir 66 is reduced to the level of the brake pipe 40. In this manner, the brake may be gradually applied until equalization of the pressure of the combined volume of the auxiliary reservoir 66 and the control reservoir 65. Any further brake pipe reduction will not increase the brake cylinder's 66 pressure. Increasing the brake pipe 40 pressure will result in immediate complete release of the control reservoir 65 pressure, and thus release of the brake cylinder pressure. The triple valve 93 will have moved to the release position.

Figure 7:
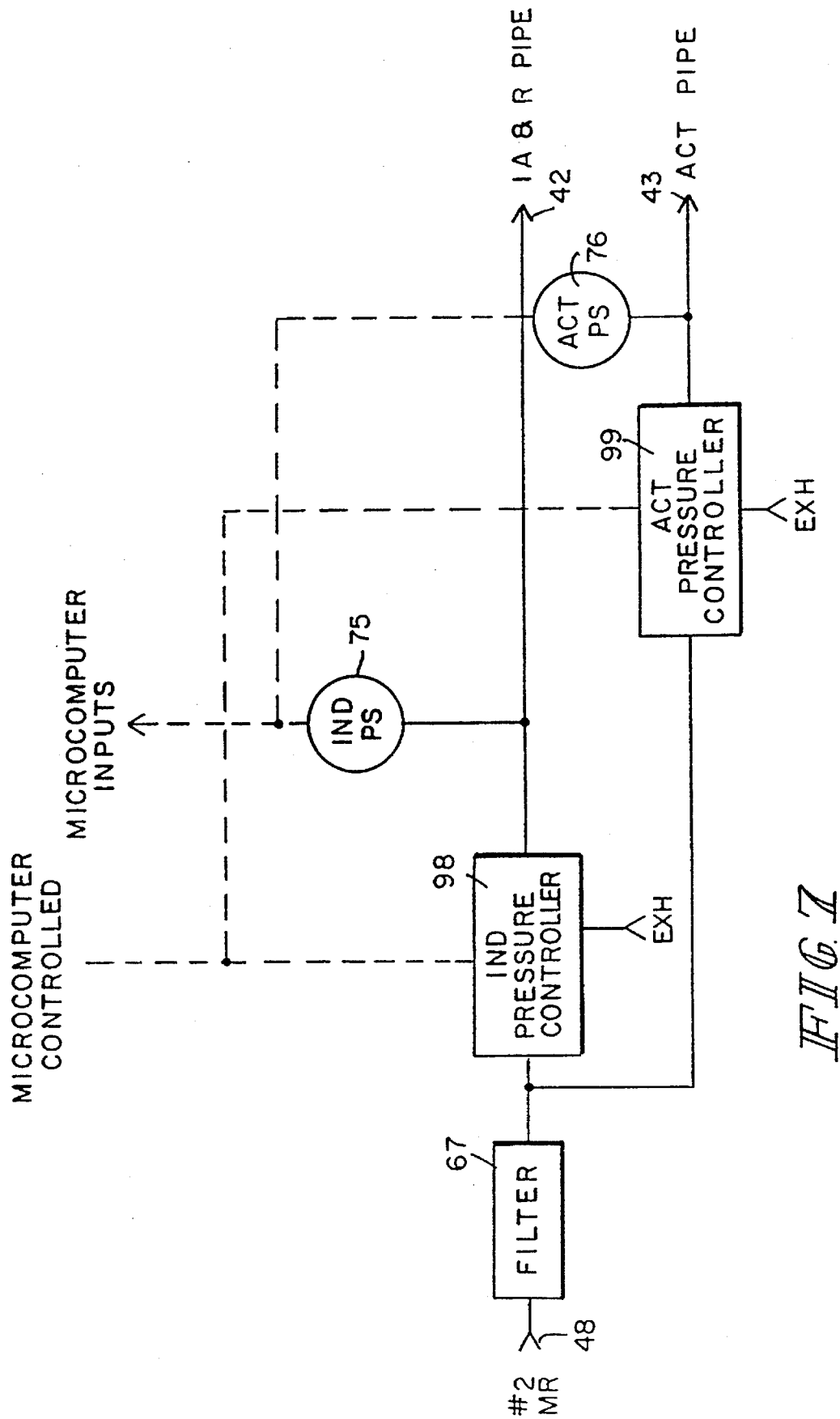
FIG. 7 is a block diagram of the independent brake control incorporating the principles of the present invention.

The independent brake control circuit of the brake control portion 62 of the interface control valve 60 is illustrated in FIG. 7. The second main reservoir 48 is connected through a common filter 67 to the independent pressure controller 98 and the actuation pressure controller 99 connected respectfully to the independent application and release pipe 42 and the actuation pipe 43. These are both electro-pneumatic devices under computer control when the locomotive is in a lead mode. Independent application and release pipe pressure sensor 75 and actuation pipe sensor 76 provides feedback signals to the microcomputer 56 which in the trailing mode provides appropriate control signal to the control reservoir pressure controller 91. Upon loss of the command signal from the microcomputer 56, the independent application and release pressure control 98 will lap neither supplying or exhausting pressure from pipe 42. Upon loss of the command signal from the micro computer 56, the actuating pressure controller 99 will exhaust pressure from pipe 43, then lap.

Figure 8:
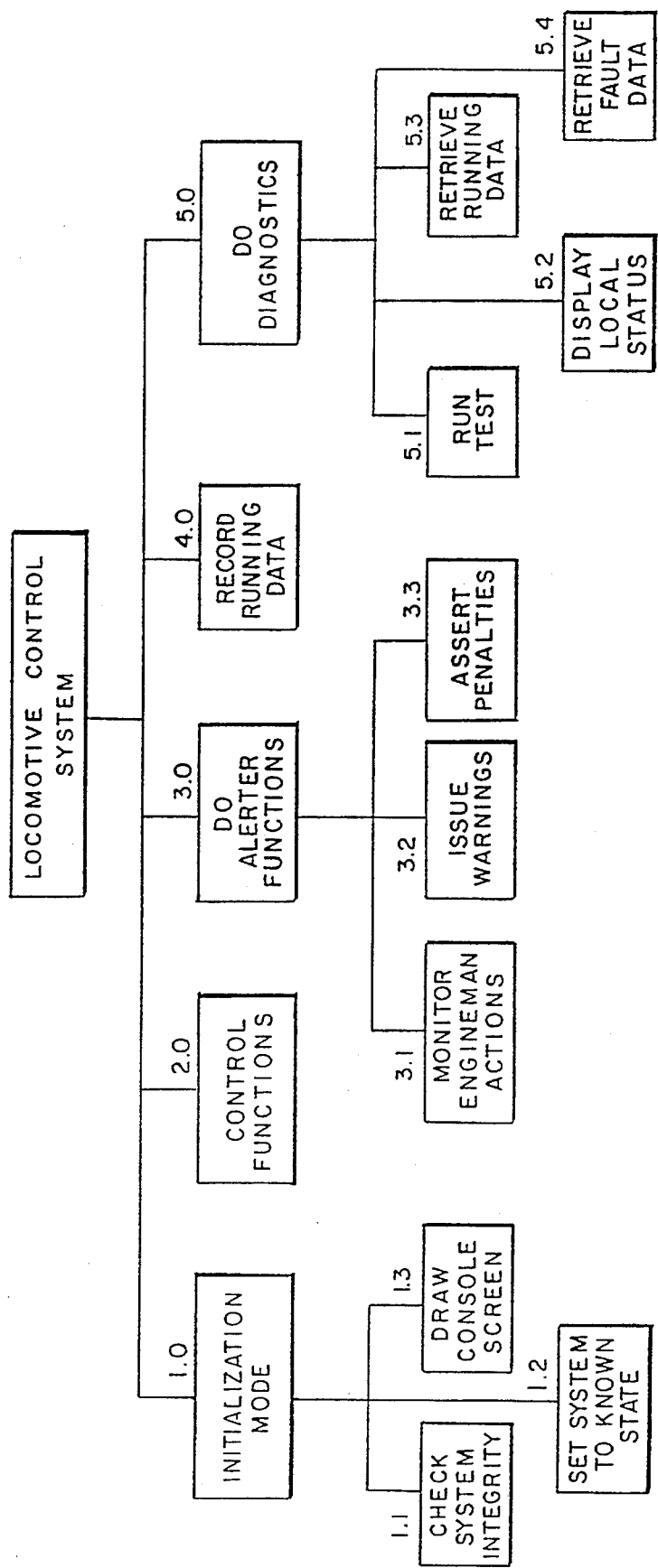
FIG. 8 is a block diagram illustrating the overall program for a locomotive control according to the present invention.
Figure 9:
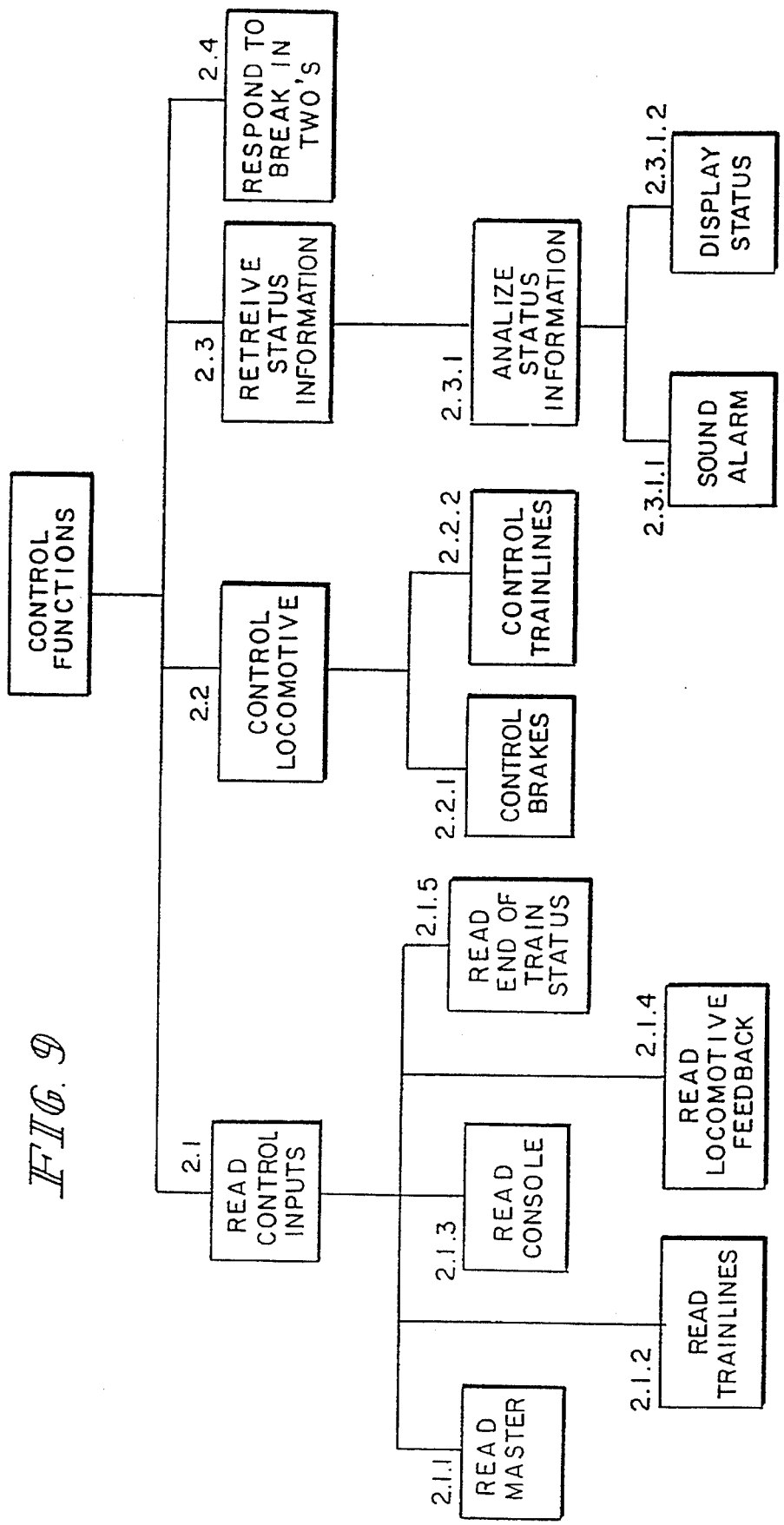
FIG. 9 is a block diagram illustrating the locomotive control portion of FIG. 8.

The hierarchy or control of the computer 56 is illustrated in FIG. 8 and 9. The locomotive control system includes the Initialization Mode 1.0, the Control Functions 2.0, the Do Alert Functions 3.0, Record Running Data 4.0 and Do Diagnostic 5.0.

The Initialization Mode 1.0 is entered when a unit is turned on. First thing a unit must do when it starts up is determine that it can function properly. Routine 1.1 checks the system integrity which includes CPU functions, the memory units as well as the timer functions. Once the system has found to operate properly, it parameters need to be initialized to values from memory and output set to known states by routine 1.2. Draw Console screen 1.3 drives the display to known states and then is drawn with the appropriate areas enabled for touch sensitivity.

The Control Functions 2.0 reads the control inputs from the engine men, retrieves status information from locomotive equipment and trainlines, then makes decisions about how to control the train and displays the current status on the console. Read control inputs to 2.1 reads inputs from the master controller 50, touch screen display 52, the trainlines and various feedbacks. The master controller 50 is read at 2.1.1, the trainlines are read at 2.1.2, the auxiliary control console 54 is read at 2.1.3, locomotive feedback signals for example speed, motor current, and switch closures are read at 2.1.4 and end of train status is read at 2.1.5.

The Control Locomotive 2.2 determines control requirements for the locomotive based on the operator inputs and the status of the end of train. The appropriate commands for the brake equipment to control the brake pipe and brake cylinder pressure are produced by the control brake routine 2.2.1. These commands will cause the brake equipment to function like a 26L type system. Various signals are also sent to safety devices in the brake equipment. The trainline control routine 2.2.2 energizes the trainline to control the locomotive propulsion equipment.

Routine 2.3 retrieves status and information on various points of the locomotive propulsion equipment, the braking equipment and from the end of train unit. System information is analyzed at 2.3.1, alarms are sounded at 2.3.1.1 and the current status of the train is displayed at 2.3.1.2. If a break in two is detected, the computer by the break in two routines 2.4 may retain the locomotive power for a very short period of time to keep the end of the train from ramming the locomotive during a stop.

The Alert Functions under 3.0 monitors the actions of the engine man to determine that he is alive and in control of train. If the engine man does not demonstrate that he is in control, appropriate warning and penalties will be issued. Routine 3.1, monitors the engine man's actions, with 3.2 providing warning signals. If the operator has not responded to the warning signals within a predescribed period of time, a penalty application will be enforced under routine 3.3.

Certain locomotive operating conditions such as handle positions, speed, and air pressure will be continuously stored in nonvolatile memory for later reference under Recording Running Data routine 4.0. Periodic diagnostic tests are run to determine operational status under routine 5.0. Specific tests to be run are run by 5.1 which includes the CPU, clock, and various memories. Current fault status is displayed by subroutine 5.2. Running data and fault data are sent to a printing device by routines 5.3 and 5.4.

Figure 10:
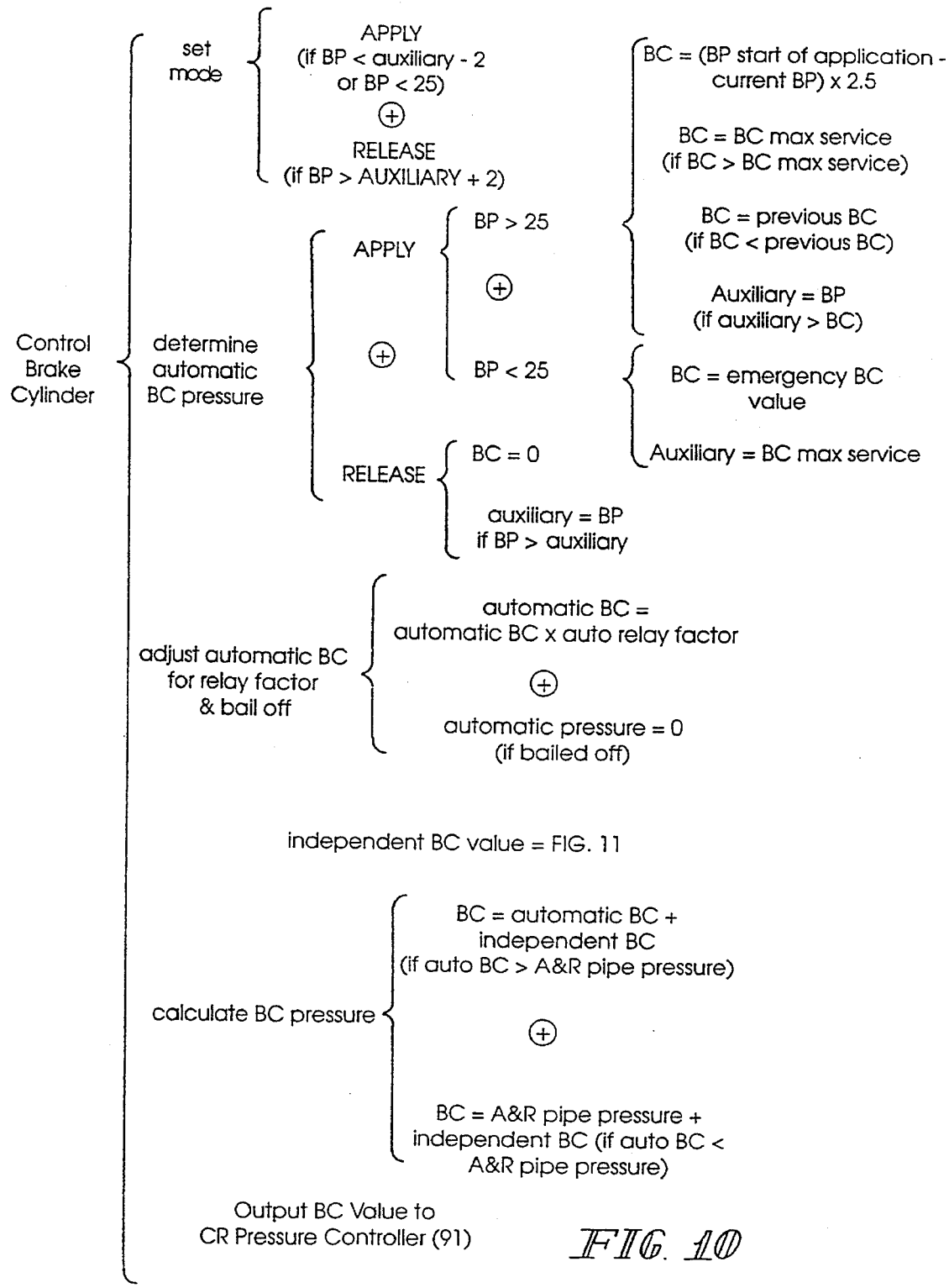
FIG. 10 is a flow chart of the control brake cylinder portion of FIG. 9.

The flow chart for the control calculation of the brake cylinder is illustrated in FIG. 10. First, the set mode of the apply or release mode is determined. Next, the automatic brake cylinder pressure is determined. This value is adjusted for relay factor and bailoff. Also, the independent brake cylinder value is determined and is set to the apply and release pipe pressure modified by the independent relay factor. Finally, the brake cylinder pressure is calculated, depending upon whether the automatic desired brake cylinder pressure is greater than or less than the independent application and release pipe pressure. Finally, the pressure of the control reservoir is controlled to control the brake cylinder.

Figure 11:
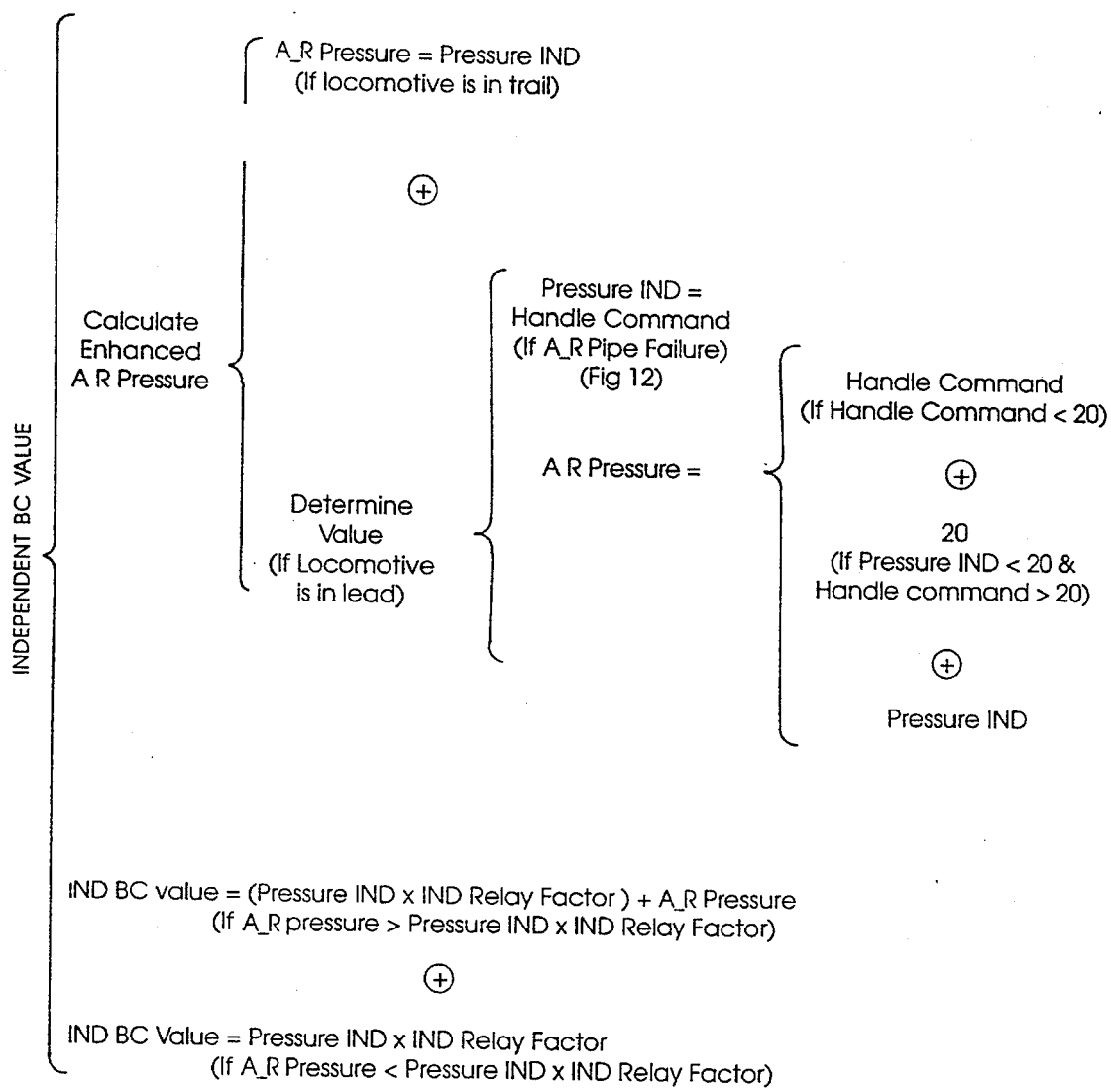
FIG. 11 is a flow chart of the determination of the independent application and release pressure.

FIG. 11 is a flow diagram showing the determination of the desired independent application and release pipe pressure value (Independent BC value). This shows the ability to select between the independent application and release control handle and the value in the independent application and release pipe. Initially, the independent application and release pipe pressure is obtained and signified as pressure IND. Next, the calculation of the enhanced A_R pressure is performed. If the locomotive is in trail mode, the A_R is set equal to the pressure IND. If the locomotive is in the lead mode, an enhanced A_R value is determined. As with respect to FIG. 12, if the independent auxiliary and release pipe is considered to have failed, the pressure IND is set equal to the independent handle command. This will allow the appropriate braking as a function of the independent handle command in the lead locomotive only.

The enhanced A_R pressure is then set to one of three values, whether the independent application and release pipe has failed or not. If the independent handle command has a position of less than 20 PSI, the enhanced A_R pressure is set to the handle command. If the pressure IND is less than 20 PSI and the handle command is greater than 20 PSI, the enhanced A_R is set equal to 20 PSI. For all other conditions, namely when the pressure IND is greater than 20 PSI and the handle command is greater than 20 PSI, then the enhanced A_R pressure is set equal to pressure IND. If the independent application and release pipe has failed, the enhanced A_R pressure is set to the handle command in either the first or third logic step.

If the enhanced A_R is greater than the pressure IND times the independent relay factor, then the independent brake cylinder value is equal to the pressure IND times the independent relay factor plus the enhanced A_R pressure. For all of the conditions, the independent brake cylinder value is set equal to the pressure IND times the independent relay factor. Alternatively, the independent brake cylinder value is equal to the pressure IND times the independent relay factor plus the enhanced A_R pressure for all conditions. This is independent BC value that is used in FIG. 10 to calculate the brake cylinder pressure.

Figure 12:
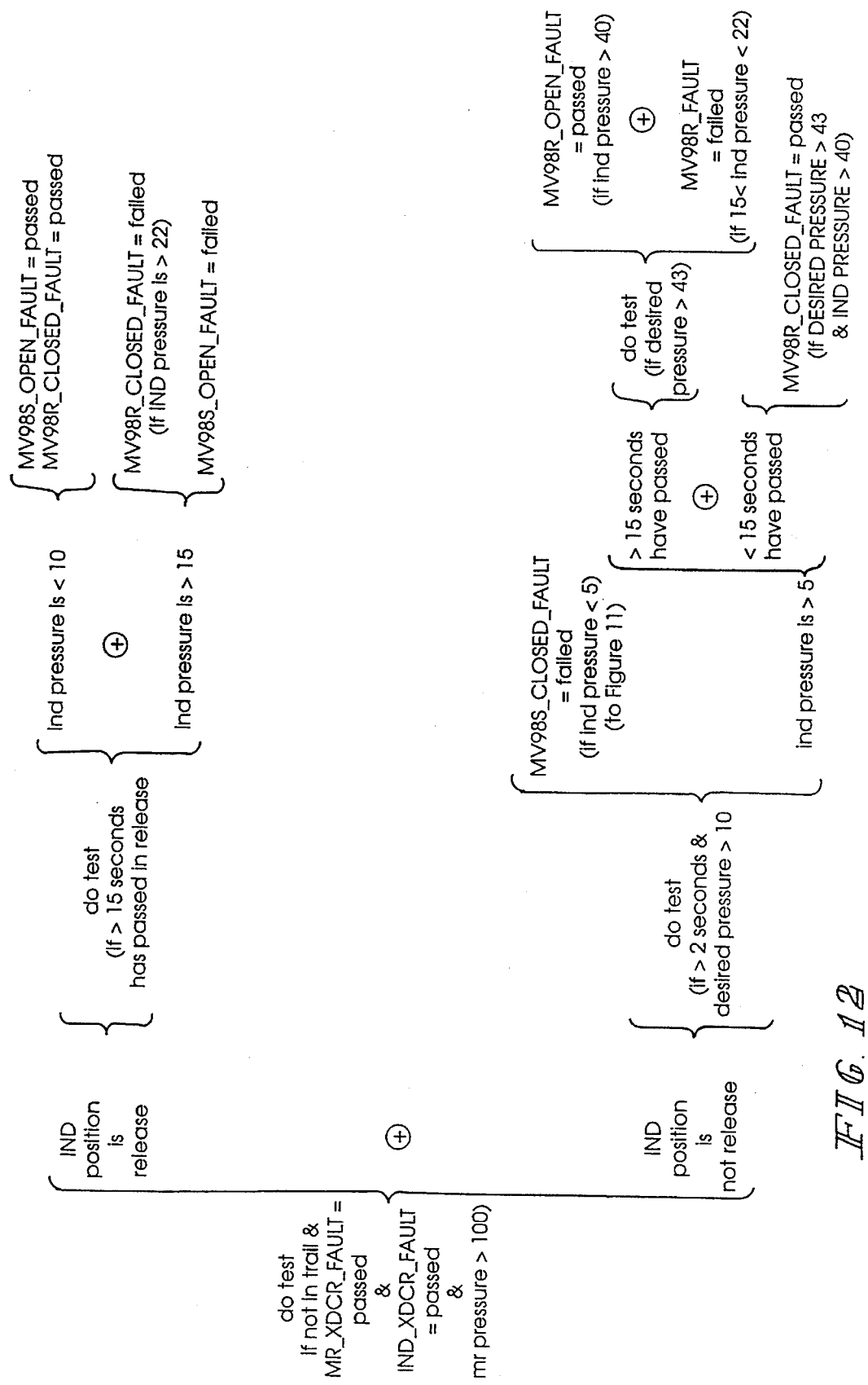
FIG. 12 is a flow chart of the test programs.

FIG. 12 is a flow chart of the logic for determining faults. This flow chart should also indicate that the independent application and release handle is used for the failures which is described in FIG. 12. FIG. 12 is a flow chart of the test routines. Initially, the tests are conducted if the computer is not in the trail mode, or is in the lead mode, and the main reservoir transducer and the independent application and release pipe transducers have passed and the main reservoir pressure is greater than 100 PSI. If the independent handle is in the release position, the test of the independent application and release pipe pressure IND is conducted after 15 seconds. If the IND pressure is less than 10 PSI, the magnetic supply valve 98 is passed for the open condition and the magnetic release valve 98 is passed for the closed position. Alternatively, if the independent application and release pipe pressure IND is greater than 15 PSI, the magnetic release valve 98 is determined failed closed, if the independent pressure is greater than 22 pounds. Alternatively, the magnetic supply valve 98 is determined failed open if the independent pressure is less than 22 pounds.

A second tree of tests are performed if the independent handle position is not in release. After a passage of two seconds and if the desired independent application and release pressure is greater than 10 PSI, the tests are conducted. If the independent pipe pressure IND is less than 5 PSI, this indicates a closed failure of the magnetic supply valve 98. It is this failure which is used in the routine of FIG. 11 to control the brake cylinder pressure from the independent application and release brake handle 32 instead of from the independent application and release pipe 42. Alternatively, if the independent pressure is greater than 5 PSI, and less than 15 seconds have passed, the magnetic supply valve 98 is determined passed if the desired pressure is greater than 43 PSI and the actual independent application and release pressure IND is greater than 40. If greater than 15 seconds have passed, the determination is made whether the desired independent application and release pressure IND is greater than 43 PSI, the magnetic release valve 98 passes if the independent pressure is greater than 40 and it fails, if the independent application and release pressure IND is between 15 and 22 PSI.

These tests are part of the improved independent brake control in addition to the early response using the independent brake handle.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A computerized locomotive control system for a locomotive having a brake pipe and at least an independent application and release pipe and a brake cylinder, said system comprising:

input means for receiving electrical signals representing braking control signals from at least an independent application and release controller and said independent application and release pipe and electrical signals representing leading and trailing modes;

computer means for determining desired pipe pressure signals for all of said pipes in response to said braking control signals and determining a brake cylinder control signal only in said leading mode and not in said trailing mode in response to both said braking control signals from said independent application and release controller and said independent application and release pipe; and means for controlling pressure in all of said pipes and said brake cylinder in response to said desired pipe pressure signals and said brake cylinder control signal.

2. A computerized locomotive control system according to claim 1 wherein said input means receives electrical signals representing brake pipe pressure; and said computer means determines said brake cylinder control signal also from said brake pipe pressure signals.

3. A computerized locomotive control system according to claim 2 wherein said input means receives electrical signals representing actuating pipe pressure in an actuating pipe; and said computer means determines said brake cylinder control signal also from said actuating pipe pressure signals.

4. A computerized locomotive control system according to claim 1 wherein said input means receives electrical signals representing actuating pipe pressure in an actuating pipe; and said computer means determines said brake cylinder control signal also from said actuating pipe pressure signals.

5. A computerized locomotive control system according to claim 1 wherein said pressure controlling means for said brake cylinder includes a control reservoir; and said computer means determines a desired control reservoir pressure signal as said brake cylinder control signal in response to said braking control signals.

6. A computerized locomotive control system according to claim 1 wherein said computer means determines said bake cylinder control signal initially in response to the braking control signals from said independent application and release controller and subsequently in response to the braking control signals from said independent application and release pipe.

7. A computerized locomotive control system according to claim 6 wherein said computer means determines said brake cylinder control signal initially in response to apply braking control signals and release braking control signals from said independent application and release controller.

8. A computerized locomotive control system according to claim 1 wherein said computer means determines said brake cylinder control signal in response to the braking control signals from said independent application and release controller for independent application and release pipe pressure up to approximately 20 psi and in response to the braking control signals from said independent application and release pipe for said independent application and release pipe pressure above approximately 20 psi.

9. A computerized locomotive control system according to claim 1 wherein said computer means determines said brake cylinder control signal in response to apply braking control signals and release braking control signals from said independent application and release controller for said independent application and release pipe pressure up to approximately 20 psi.

10. A computerized locomotive control system according to claim 1 wherein said computer means determines failure of said independent application and release pipe and determines said brake cylinder control signal in response to the braking control signals from said independent application and release controller during said determined failure of said independent application and release pipe.

11. A computerized locomotive control system according to claim 10 wherein said computer means of determines said failure of said independent application and release pipe when said desired independent application and release pipe pressure is above a first value and said independent application and release pipe pressure is below a second value less than said first value after a predetermined period of time.

* * * * *